(12) United States Patent
Shen

(10) Patent No.: US 9,331,741 B2
(45) Date of Patent: May 3, 2016

(54) POWER LINE COMMUNICATION SYSTEM AND CONTROL METHOD THEREOF

(71) Applicant: Wistron NeWeb Corp., Hsinchu (TW)

(72) Inventor: Sheng-Kun Shen, Hsinchu (TW)

(73) Assignee: Wistron NeWeb Corp., Hsinchu (TW)

( * ) Notice: Subject to any disclaimer, the term of this patent is extended or adjusted under 35 U.S.C. 154(b) by 402 days.

(21) Appl. No.: 14/046,115

(22) Filed: Oct. 4, 2013

(65) Prior Publication Data

US 2014/0133585 A1    May 15, 2014

(30) Foreign Application Priority Data

Nov. 12, 2012   (TW) .............................. 101141983 A

(51) Int. Cl.
*H04B 3/54* (2006.01)

(52) U.S. Cl.
CPC .................................... *H04B 3/542* (2013.01)

(58) Field of Classification Search
CPC .......... H04B 3/54; H04B 3/542; H04B 3/544; H04B 3/546
USPC ................................. 307/257, 259
See application file for complete search history.

(56) References Cited

U.S. PATENT DOCUMENTS

| | | | | |
|---|---|---|---|---|
| 6,104,707 A * | 8/2000 | Abraham | ............ | H02J 13/0031 340/12.36 |
| 6,317,031 B1 * | 11/2001 | Rickard | .................... | H04B 3/56 307/3 |
| 8,824,264 B2 * | 9/2014 | Fang | ......................... | H04B 3/32 370/201 |
| 2007/0054622 A1 * | 3/2007 | Berkman | ................ | H04B 3/542 455/67.11 |
| 2007/0229231 A1 * | 10/2007 | Hurwitz | .................... | H04B 3/54 455/402 |
| 2008/0170540 A1 * | 7/2008 | Fukuda | .................. | H04B 3/542 370/328 |
| 2008/0185917 A1 * | 8/2008 | Carroll | ..................... | H04B 3/56 307/89 |
| 2008/0190639 A1 * | 8/2008 | Baran | ....................... | H04B 3/56 174/50 |
| 2009/0306844 A1 * | 12/2009 | Arita | .......................... | B60R 1/00 701/31.4 |
| 2011/0284700 A1 * | 11/2011 | Brand | .................. | B61L 15/0036 246/28 R |
| 2012/0014288 A1 * | 1/2012 | Dore | ...................... | H04W 16/20 370/255 |
| 2012/0163435 A1 * | 6/2012 | Reuven | ..................... | H04B 3/54 375/222 |
| 2013/0335207 A1 * | 12/2013 | Magin | ...................... | H04B 3/54 340/12.37 |

* cited by examiner

*Primary Examiner* — Kenneth B Wells
*Assistant Examiner* — James P Evans
(74) *Attorney, Agent, or Firm* — Muncy, Geissler, Olds & Lowe, P.C.

(57) ABSTRACT

A power line communication system includes a power distribution device connected to two power lines, a plurality of power line communication devices and a first coupler device electrically connected between the first power line and the second power line. The first coupler device is configured at the last end of the power line communication system. Before a transmitting device transmits data to a receiving device, the first coupler device determines whether to couple the power lines with each other according a first signal quality between the transmitting and the receiving device when the power lines are not coupled with each other and a second signal quality between the transmitting and the receiving device when the power lines are coupled with each other.

18 Claims, 13 Drawing Sheets

T1

|   | A | B | C | D | Y1_L1 | Y1_L2 |
|---|---|---|---|---|---|---|
| A |   | 45 | 80 | 40 | 70 | 30 |
| B | 45 |   | 40 | 80 | 30 | 70 |
| C | 80 | 40 |   | 35 | 75 | 25 |
| D | 40 | 80 | 35 |   | 25 | 75 |

|   | A | B | C | D | Y1 |
|---|---|---|---|---|---|
| A |   | 55 | 80 | 60 | 70 |
| B | 55 |   | 60 | 80 | 70 |
| C | 80 | 60 |   | 65 | 75 |
| D | 60 | 80 | 65 |   | 75 |

|   | Y1_L1 | Y1_L2 | Y1 | Group |
|---|---|---|---|---|
| A | 70 | 30 | 70 | L1 |
| B | 30 | 70 | 70 | L2 |
| C | 75 | 25 | 75 | L1 |
| D | 25 | 75 | 75 | L2 |

FIG. 9 c

POWER LINE COMMUNICATION SYSTEM AND CONTROL METHOD THEREOF

CROSS REFERENCE TO RELATED APPLICATIONS

This application claims priority of Taiwan Patent Application No. 101141983, filed on Nov. 12, 2012, the entirety of which is incorporated by reference herein.

BACKGROUND OF THE INVENTION

1. Field of the Invention

The invention relates to a power line communication system in which power lines are used as communication media.

2. Description of the Related Art

Power line communication (PLC) technology uses existing power lines, such as an in-building power line network or in-car power supply lines, for transmitting digital processed data or information. In a case where an existing in-building power line network is used to transmit signals, since there is a lot of electrical equipment connected to the in-building power line network, noise usually occurs and interferes with power line communication when the electrical equipment connected to the in-building power line network is turned-on, turned-off, plugged-in or plugged-off, thereby causing problems such as an interruption in power line communication.

FIG. 1 is a block diagram of a known power line communication system in which an in-building power line network is used to transmit signals. The power line communication system comprises a distribution transformer 100, a power distribution panel 110 at a home user end, live wires L1 and L2, a neutral wire N, a ground wire G and power line communication devices A and B. The distribution transformer 100, such as a pole-mount transformer mounted on a utility pole, steps down voltage provided by a power supplier to an appropriate voltage used by the home user. The power distribution panel 110 is connected to the power line network of the home user and provides power to the power line network. For example, the power distribution panel 110 provides 110-volt single phase AC power to the live wires L1 and L2 and switches and controls the distribution of power. For the sake of brevity, FIG. 1 only illustrates a part of the power line network. Conventionally, data is transmitted from the power line communication device A to the power line communication device B through a path including the live wire L1, the power distribution panel 110 and the live wire L2, as shown by the path P in FIG. 1. However, when serious interference occurs on the live wire L1 due to noise 120, such as a turning-on, turning-off, plugging-in or plugging-off of electrical equipment, the power line communication may be interrupted.

In order to solve problems caused by noise interference, some technologies may use filters configured in the power line communication system to filter noise so as to reduce noise interference.

BRIEF SUMMARY OF THE INVENTION

In order to solve problems caused by noise interference in a power line communication system, the invention utilizes a coupler device that selectively couples two live wires with each other to control transmission paths in the power line communication system so as to prevent an interruption of data transmission caused by noise interference.

An embodiment of the invention provides a power line communication system, comprising: a first power line; a second power line; a power distribution device, electrically connected to the first power line and the second power line, and supplying power to the first power line and the second power line; a plurality of power line communication devices, at least comprising a transmitting device and a receiving device, wherein each of the plurality of power line communication devices is electrically connected to at least one of the first power line and the second power line; and a first coupler device, electrically connected between the first power line and the second power line, and determining, before the transmitting device transmits data to the receiving device, whether to couple the first power line to the second power line according a first signal quality between the transmitting device and the receiving device when the first coupler device doesn't couple the first power line to the second power line and a second signal quality between the transmitting device and the receiving device when the first coupler device couples the first power line to the second power line, wherein positions on the first power line and the second power line which the first coupler device is connected to are farther from the power distribution device than that which each of the plurality of power line communication devices is connected to.

Another embodiment of the invention provides a power line communication system control method, applied to a power line communication system comprising: a first power line; a second power line; a power distribution device, electrically connected to the first power line and the second power line, and supplying power to the first power line and the second power line; a plurality of power line communication devices, at least, comprising a transmitting device and a receiving device, wherein each of the plurality of power line communication devices is electrically connected to at least one of the first power line and the second power line; and a first coupler device, electrically connected between the first power line and the second power line, wherein positions on the first power line and the second power line which the first coupler device is connected to are farther from the power distribution device than that which each of the plurality of power line communication devices is connected to, wherein the power line communication system control method comprises: determining, before the transmitting device transmits data to the receiving device, whether to couple the first power line to the second power line according a first signal quality between the transmitting device and the receiving device when the first coupler device doesn't couple the first power line to the second power line and a second signal quality between the transmitting device and the receiving device when the first coupler device couples the first power line to the second power line.

A detailed description is given in the following embodiments with reference to the accompanying drawings.

BRIEF DESCRIPTION OF THE DRAWINGS

The invention can be more fully understood by reading the subsequent detailed description and examples with references made to the accompanying drawings, wherein:

FIG. 9A to 9C are block diagrams of PHY rate tables according to an embodiment of the invention;

DETAILED DESCRIPTION OF THE INVENTION

Figure 1:
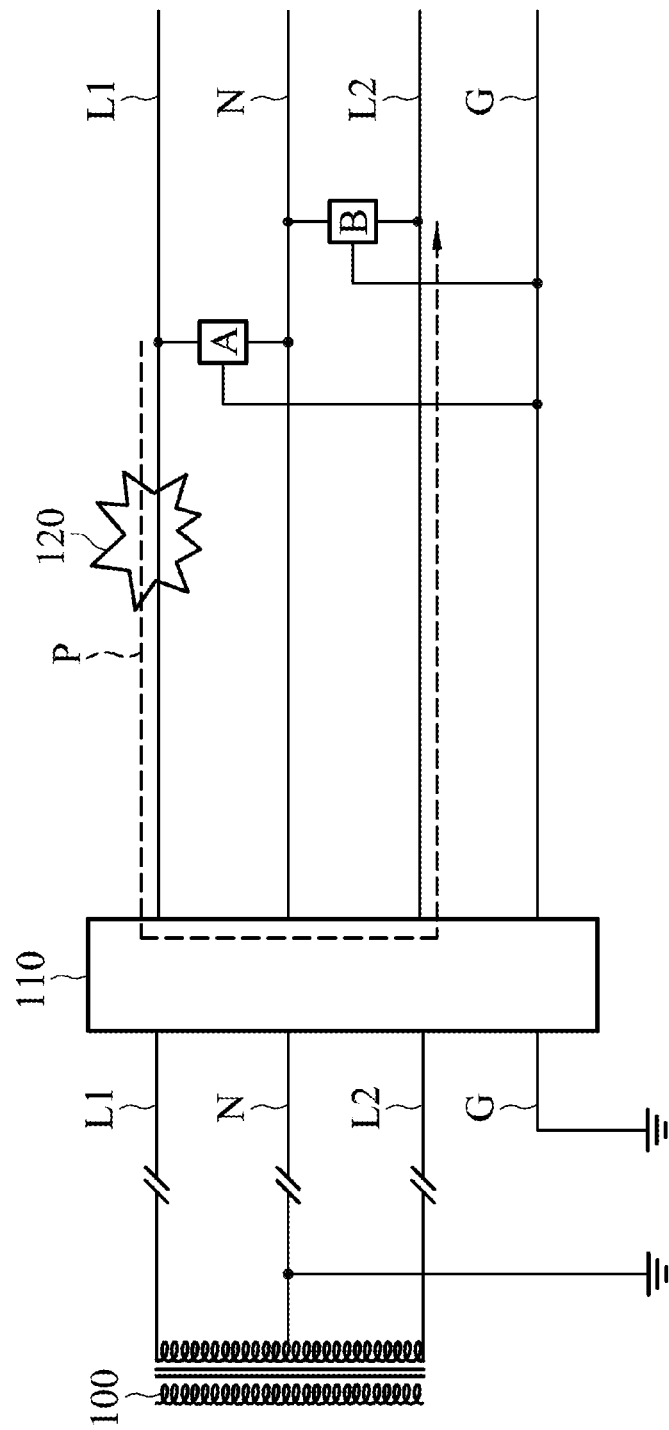
FIG. 1 is a block diagram of a power line communication system according to known technologies.

This description is made for the purpose of illustrating the general principles of the invention and should not be taken in a limiting sense.

It is to be understood that the following disclosure provides many different embodiments, or examples, for implementing different features of the application. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed. The scope of the invention is best determined by reference to the appended claims. Moreover, the formation of a feature on, connected to, and/or coupled to another feature in the present disclosure that follows may include embodiments in which the features are formed in direct contact, and may also include embodiments in which additional features may be formed interposing the features, such that the features may not be in direct contact.

Figure 2:
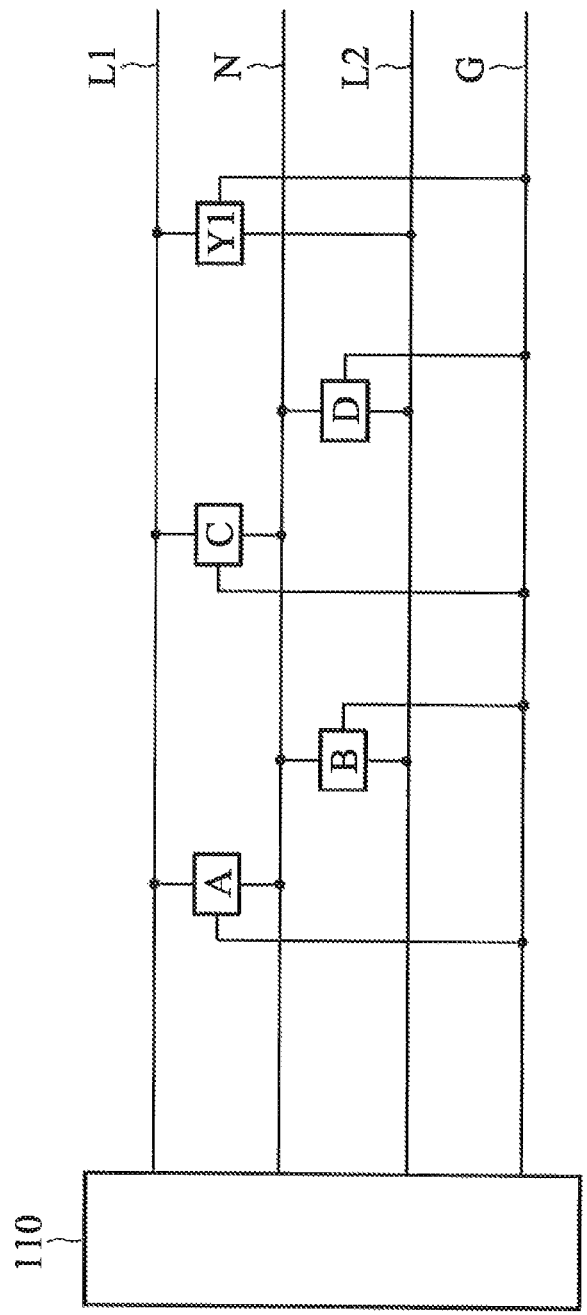
FIG. 2 is a block diagram of a power line communication system according to an embodiment of the invention.

In the disclosure, in order to avoid places where noise occurs when data is transmitted, a coupler device that selectively couples two live wires with each other is used to provide another transmission path through which data can be transmitted without any interruption caused by noise. FIG. 2 is a block diagram of a power line communication system according to an embodiment of the invention. The power line communication system comprises a power distribution panel 110, live wires L1 and L2 connected to the power distribution panel 110, a neutral wire N, a ground wire G, power line communication devices A, B, C and D and a coupler device Y1 configured at the last end of the power line communication system. Each of the power line communication devices A, B, C and D is electrically connected to at least one of the live wires L1 and L2. The coupler device Y1, electrically connected to the live wires L1 and L2, selectively couples the live wire L1 to the live wire L2. The coupler device Y1 is configured at the last end of the power line communication system. In other words, the coupler device Y1 is located farthest away from the power distribution panel 110 than all other power line communication devices. When a live wire is interfered by noise, a power line communication device may transmit data packets to a target communication device through another path provided by the coupler device Y1.

Figure 3B:
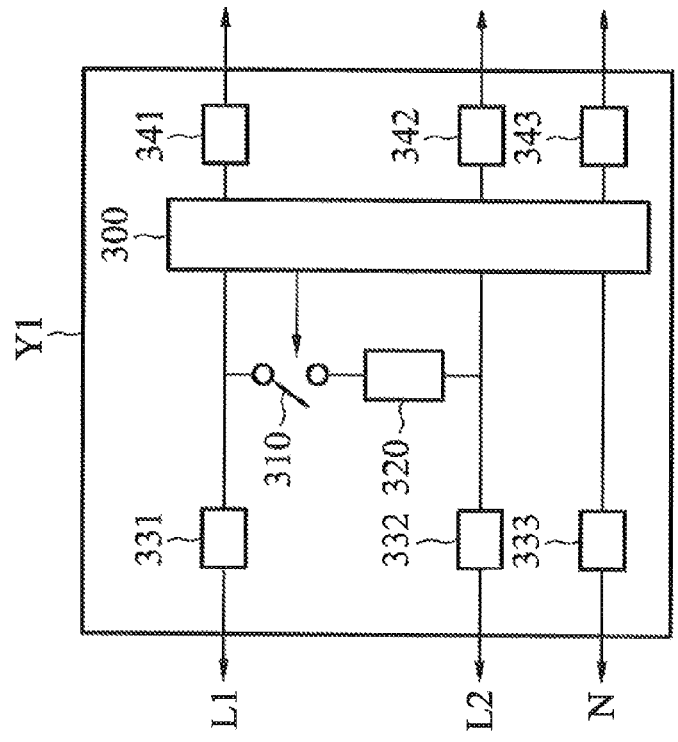
FIG. 3B is a block diagram of a coupler device according to an embodiment of the invention.
Figure 3A:
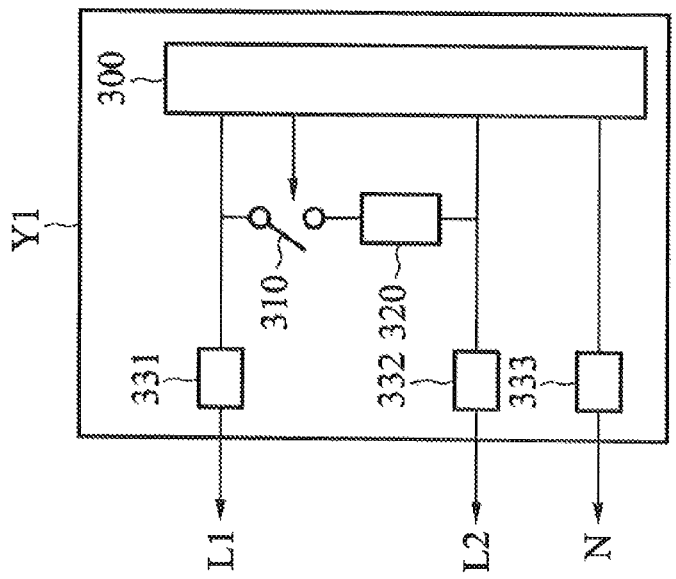
FIG. 3A is a block diagram of a coupler device according to an embodiment of the invention.

FIG. 3A is a block diagram of the coupler device Y1 according to an embodiment of the invention. The coupler device Y1 comprises a process control unit 300, a coupler switch 310, a coupler 320 and pins 331, 332 and 333. The pin 331 is connected to the live wire L1, the pin 332 is connected to the live wire L2, and the pin 333 is connected to the neutral wire N, The coupler switch 310 is connected in series to the coupler 320 between the live wires L1 and L2. When the coupler switch is closed, the coupler 320 couples the live wire L1 to the live wire L2, that is, the coupler 320 couples signals on the live wire L1 to the live wire L2 or couples signals on the live wire L2 to the live wire L1. The process control unit 300 is connected to the coupler switch 310 and pins 331, 332 and 33 and controls the coupler switch 310. The flowchart of controlling the coupler switch 310 by the process control unit 300 will be described later. FIG. 3B is a block diagram of the coupler device Y1 according to another embodiment of the invention. The difference between the coupler device Y1 in FIG. 3A and the coupler device. Y1 in FIG. 3B is that the coupler device Y1 in FIG. 3B further comprises pins 341, 342 and 343. The pins 341, 342 and 343 are connected to the live wire L1, the live wire L2 and the neutral wire N, respectively. The coupler device Y1 may be connected to a 220-volt electrical device, such as a computer or an access point (AP), via the pins 341, 342 and 343. Therefore, the electrical device can be included in the power line communication system to communicate with any other power line communication device.

Figure 4A:
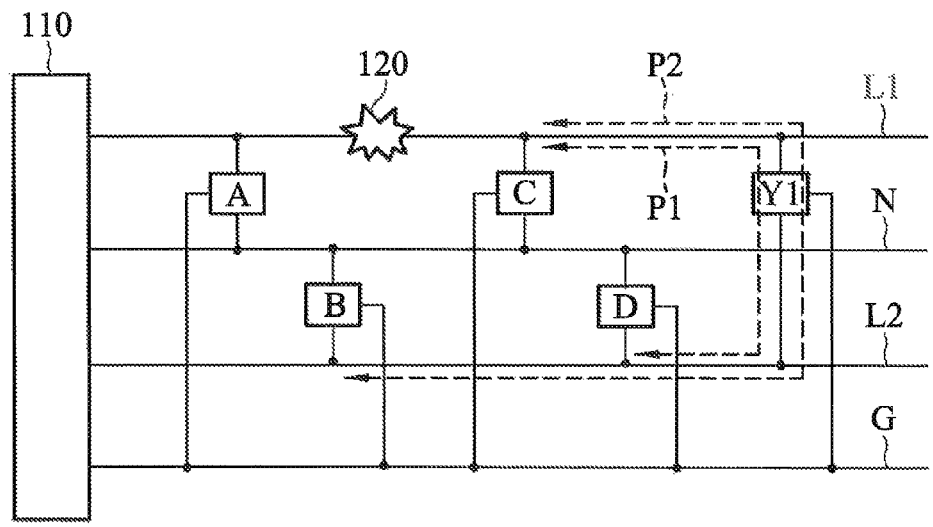
FIG. 4A to 4C are block diagrams of a power line communication system according to an embodiment of the invention.
Figure 4B:
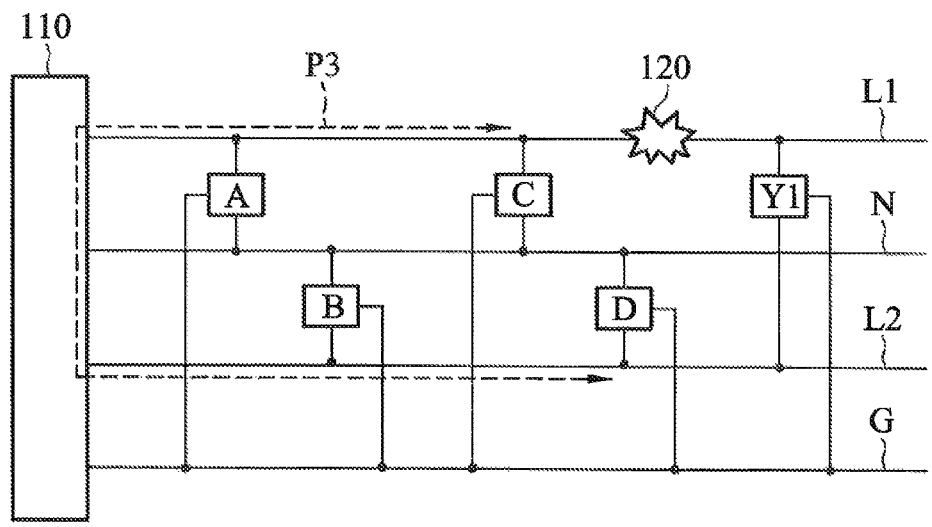
Figure 4C:
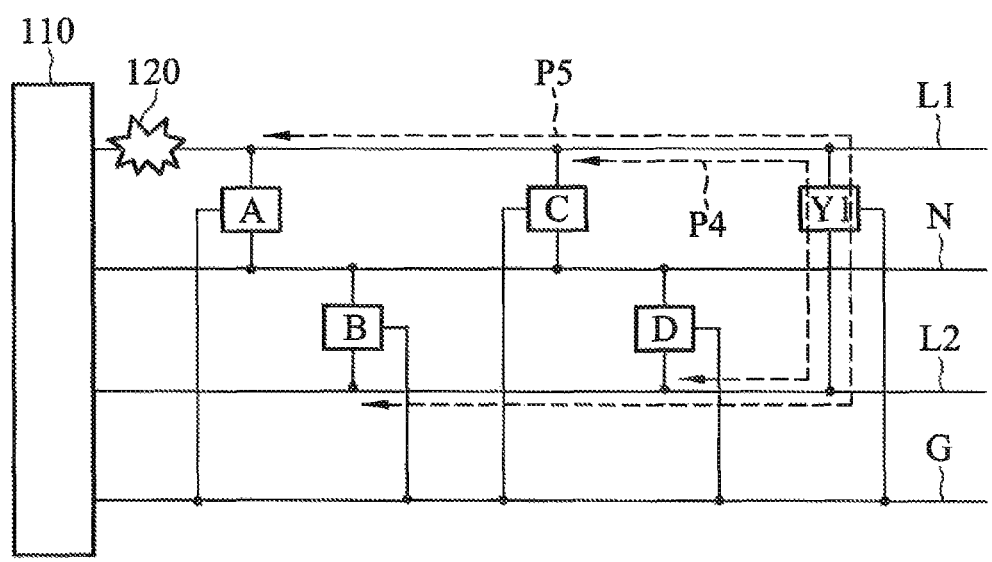

FIG. 4A to 4C illustrate the function of the coupler device Y1 in the power line communication system. FIG. 4A to 4C are block diagrams of the power line communication system according to an embodiment of the invention. In an example as shown in FIG. 4A, when noise 120 occurs on the live wire L1 and between the communication devices A and C, if the communication device C is going to communicate with the communication device D, the communication device C can communicate with the communication device D through a path including the live wire L1, the coupler device Y1 in which the coupler switch 310 is closed and the live wire L2 (as shown by the path PI in FIG. 4A). Similarly, if the communication device C is going to communicate with the communication device B, the communication device C can communicate with the communication device B through a path including the live wire L1, the coupler device Y1 in which the coupler switch 310 is closed and the live wire L2 (as shown by the path P2 in FIG. 4A). Therefore, data can be transmitted through another path provided by the coupler device Y1 in which the coupler switch 310 is closed (rather than the conventional path that passes through the power distribution panel 110) to avoid the place where the noise 120 occurs. In an example as shown in FIG. 4B, when noise 120 occurs on the live wire L1 and between the communication device C and the coupler device Y1, if the communication device C is going to communicate with the communication device D, the communication device C can communicate with the communication device D through a path including the live wire L1, the power distribution panel 110 and the live wire L2 (as shown by the path P3 in FIG. 4B). In an example as shown in FIG. 4C, when noise 120 occurs on the live wire L1 and between the communication device A and the power distribution panel 110, if the communication device C is going to communicate with the communication device D, the communication device C can communicate with the communication device D through a path including the live wire L1, the coupler device Y1 in which the coupler switch 310 is closed and the live wire L2 (as shown by the path P4 in FIG. 4C). Similarly, if the communication device A is going to communicate with the communication device B, the communication device A can communicate with the communication device B through a path including the live wire L1, the coupler device Y1 in which the coupler switch 310 is closed and the live wire L2 (as shown by the path P5 in FIG. 4C). Therefore, data can be transmitted through another path provided by the coupler device Y1 in which the coupler switch 310 is closed (rather than the conventional path that passes through the power distribution panel 110) to avoid the place where the noise 120 occurs.

As shown in FIG. 4A to 4C, the coupler device Y1 configured at the last end of the power line communication system provides another path other than the path that passes through the power distribution panel 110. In other words, there are two transmission paths in the power line communication system of the invention. One of the transmission paths is the path that passes through the power distribution panel 110, and the other of the transmission paths is the path that passes through the coupler device Y1 in which the coupler switch is closed. Therefore, no matter where noise occurs, the invention can provide a transmission path that is able to avoid the place where the noise occurs. It is to be understood that FIG. 4A to 4C only illustrate some situations of the power line communication system of the invention. In addition, the path that passes through the power distribution panel 110 is only exemplary and the invention is not limited thereto. For example, a path that passes through the distribution transformer 100 can replace the path that passes through the power distribution panel 110. Moreover, the coupler device Y1 has to be configured at the last end of the power line communication system. In the example as shown in FIG. 4A, if the coupler device Y1 is configured between the power line communication devices A and B instead of at the last end of the power line communication system, though the coupler switch 310 of the coupler Y1 is closed, the noise 120 still cannot be avoided when the power line communication device C communicates with the power line communication device A, B or D.

Figure 5:
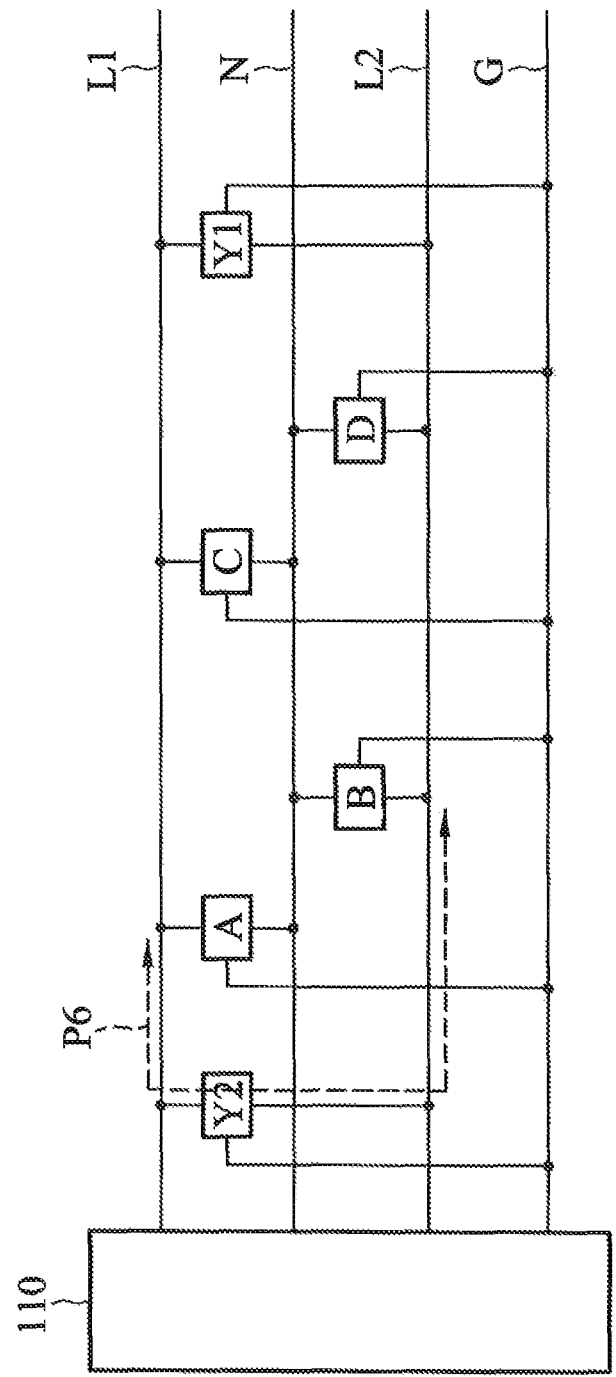
FIG. 5 is a block diagram, of a power Sine communication system according to an embodiment of the invention.

FIG. 5 is a block diagram of a power line communication system according to another embodiment of the invention. The difference between the power line communication system in FIG. 5 and the power line communication system in FIG. 2 is that the power line communication system in FIG. 5 further comprises a front-end coupler device Y2. The front-end coupler device Y2 is configured at the front end of the power line communication system. In other words, the front-end coupler device Y2 is located nearest to the power distribution panel 110 than all other power line communication devices. The front-end coupler device Y2, couples the live wire L1 to the live wire L2 and can reduce signal attenuation caused when data is transmitted through the power distribution panel 110, Therefore, the signal quality is improved. For example, when the power line communication device A is going to communicate with the power line communication device B, the power line communication device A can transmit data to the power line communication device B through a path including the live wire L1, the front-end coupler device Y2 and the live wire L2, as shown by the path P6 in FIG. 5 to avoid signal attenuation caused when data is transmitted through the power distribution panel 110.

Figure 6:
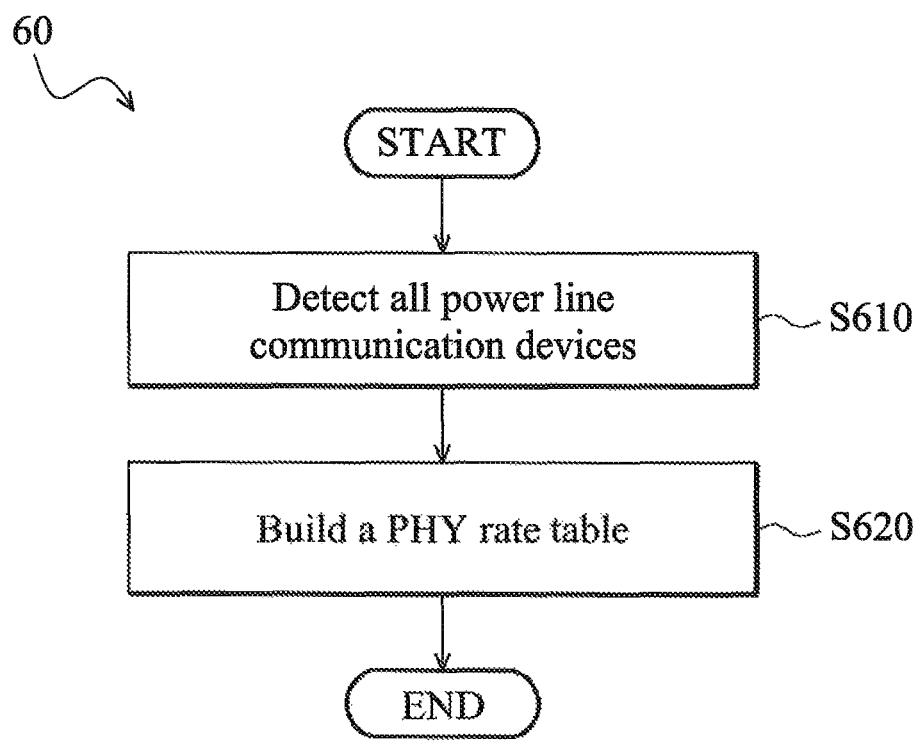
FIG. 6 is a flowchart of an initialization method of a coupler device according to an embodiment of the invention.

FIG. 6 is a flowchart of an initialization method 60 of the coupler device Y1 according to an embodiment of the invention. The initialization method 60 is performed when the coupler device Y1 is turned on or activated. Firstly, in step S610, the coupler device Y1 detects all power line communication devices in the power line communication system. For example, the process control unit 300 of the coupler device Y1 detects what power line communication devices are in the power line communication system through the live wires L1 and L2. Next, in step S620, the coupler device Y1 builds a PHY rate table. Physical layer (PHY) rates at which each power line communication device communicates with other power line communication devices are recorded in the PHY rate table, PHY rates are used to estimate signal qualities. Signal qualities can also be estimated by other known technologies or parameters. A method for building the PHY rate table will be described later with reference to FIG. 7.

Figure 7:
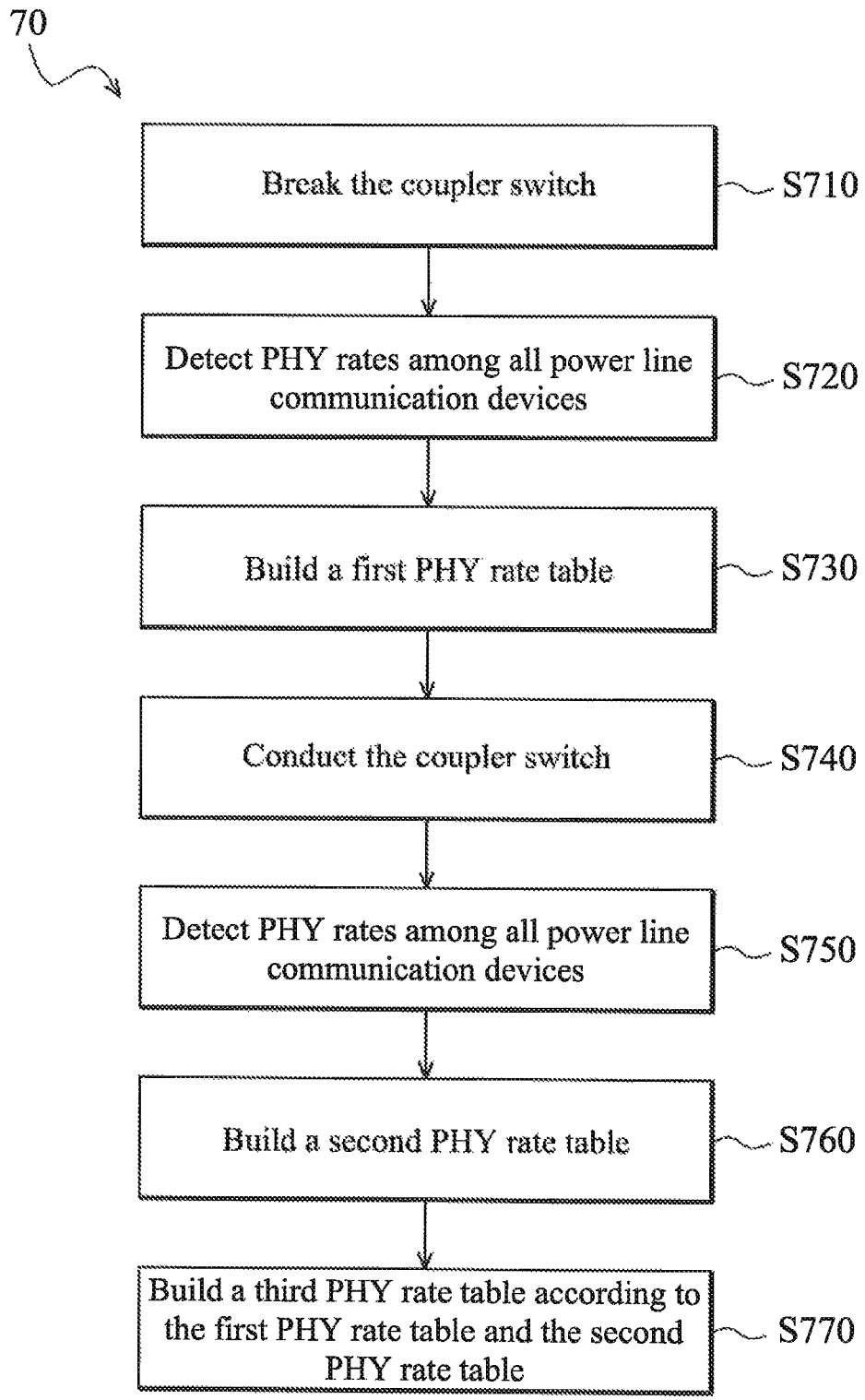
FIG. 7 is a flowchart of a method for building a PHY rate table of a coupler device according to an embodiment of the invention.

FIG. 7 is a flowchart of a method 70 for building the PHY rate table of the coupler device Y1 according to an embodiment of the invention. Firstly, in step S710, the process control unit 300 of the coupler device Y1 breaks the coupler switch 310 of the coupler device Y1 to make the coupler switch 310 open. Then, in step S720, the process control unit 300 detects PHY rates among all power line communication devices. In step S730, the process control unit 300 builds a first PHY rate table according to the detected PHY rates in step S720. In step S740, the process control unit 300 conducts the coupler switch 310 so as to couple the live wire L1 to the live wire L2 through the coupler 320. Next, in step S750, the process control unit 300 detects PHY rates among all power line communication devices. In step S760, the process control unit 300 builds a second PHY rate table according to the detected PHY rates in step S740. In step S770, the process control unit 300 builds a third PHY rate table according to the first PHY rate table and the second PHY rate table.

Figure 8:
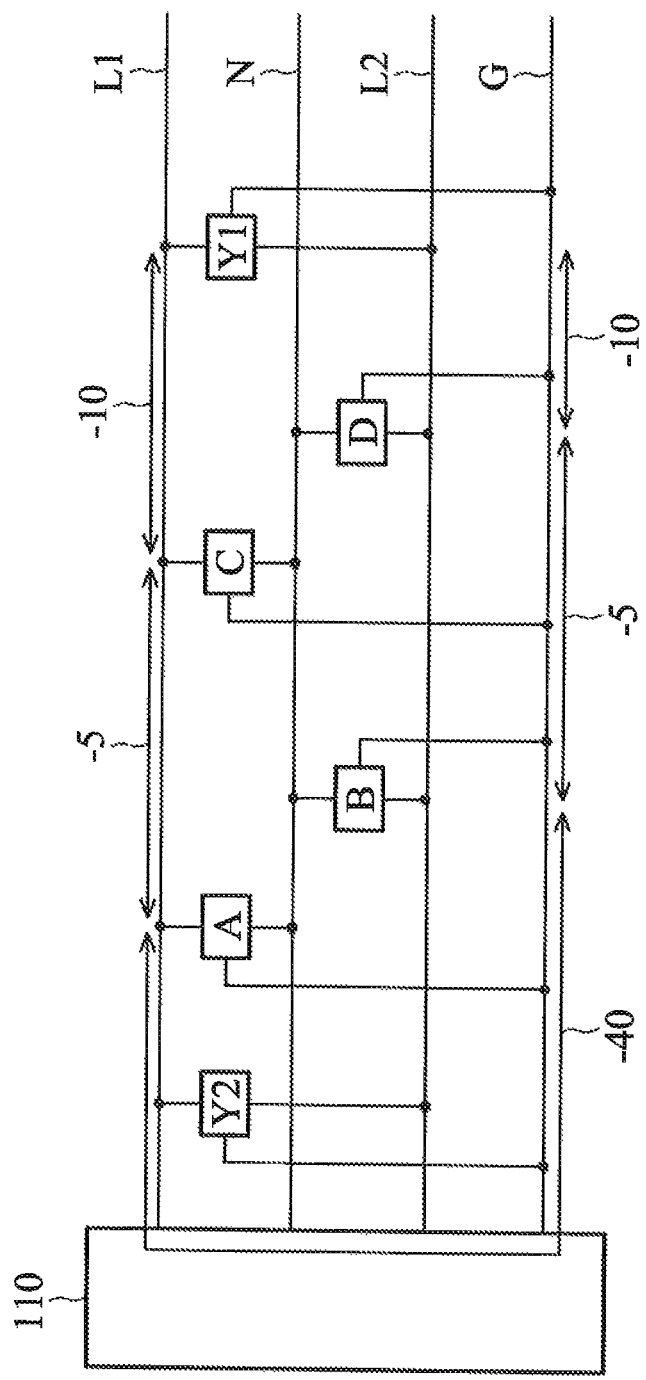
FIG. 8 is a block diagram illustrating an example of detecting PHY rates among power line communication devices.

FIG. 8 and FIG. 9A to 9C illustrate how to build the PHY rate table. In an example, PHY rates among all power line communication devices are detected by transmitting test packets. FIG. 8 is a block diagram illustrating an example of detecting PHY rates among power line communication devices, wherein quantities in FIG. 8 (e.g., −5, −40, and so on) indicate attenuations of PHY rates (a unit of attenuations is, for example, Mbps). It is assumed that a target PHY rate of the test packets is 85. Based on the example as shown in FIG. 8, when the coupler switch 310 is open, the first PHY rate table T1 shown in FIG. 9A can be obtained. PHY rates at which each power line communication device communicates with other power line communication devices when the coupler switch 310 is open (that is, the coupler device Y1 doesn't couple the live wire L1 to the live wire L2) are recorded in the first PHY rate table T1. For example, the PHY rate between the power line communication devices A and B is 85−40=45. PHY rates between the coupler device Y1 and other power line communication devices through the live wire L1 are recorded in the column Y1_L1, and PHY rates between the coupler device Y1 and other power line communication devices through the live wire L2 are recorded in the column Y1_L2. For example, the PHY rate between the power line communication device C and the coupler device Y1 through the live wire L1 is 85−10=75, and the PHY rate between the power line communication device C and the coupler device Y1 through the live wire L2 is 85−5−40−5−10=25. If the attenuation of the PHY rate is smaller, the signal quality would be better.

Similarly, when the coupler switch 310 is closed, the second PHY rate table T2 shown in FIG. 9B can be obtained. In the example, it is assumed that the attenuation of the PHY rate across the coupler device Y1 in which the coupler switch 310 is closed is 0. PHY rates at which each power line communication device communicates with other power line communication devices when the coupler switch 310 is closed (that is, the coupler device Y1 couples the live wire L1 to the live wire L2) are recorded in the second PHY rate table T2. For example, the PHY rate between the power line communication devices A and D is 85−5−10−0−1.0=60.

The third PHY rate table as shown in FIG. 9C can be obtained according to the first PHY rate table T1 and the second PHY rate table T2. PHY rates at which each power line communication device communicates with the coupler device Y1 through the live wire L1 or L2 when the coupler device Y1 doesn't couple the live wire L1 to the live wire L2 (columns Y1_L1 and Y1_L2), PHY rates at which each power line communication device communicates with the coupler device Y1 when the coupler device Y1 couples the live wire. L1 to the live wire L2 (column Y1) and group information of each power line communication device (column Group) are recorded in the third PHY rate table T3. Data in the columns Y1_L1 and Y1_L2 is obtained from the first PHY rate table T1 and data in the column Y1 is obtained from the second PHY rate table T2. The group information is determined according to data in the columns Y1_L1 and Y1_L2. The group information indicates which of the live wires L1 and L2 that each power line communication device is connected to. For example, regarding the power line communication device A, since the PHY rate (i.e., 70) at which the power line communication device A communicates with the coupler device Y1 through the live wire L1 is larger than the PHY rate (i.e., 30) at which the power line communication device. A communicates with the coupler device Y1 through the live wire L2, that is, the signal quality of transmission through the live wire L1 is better than the signal quality of transmission through the live wire L2, then it is determined that the power line communication device A is connected to the live wire L1 and belongs to the group L1.

Figure 10:
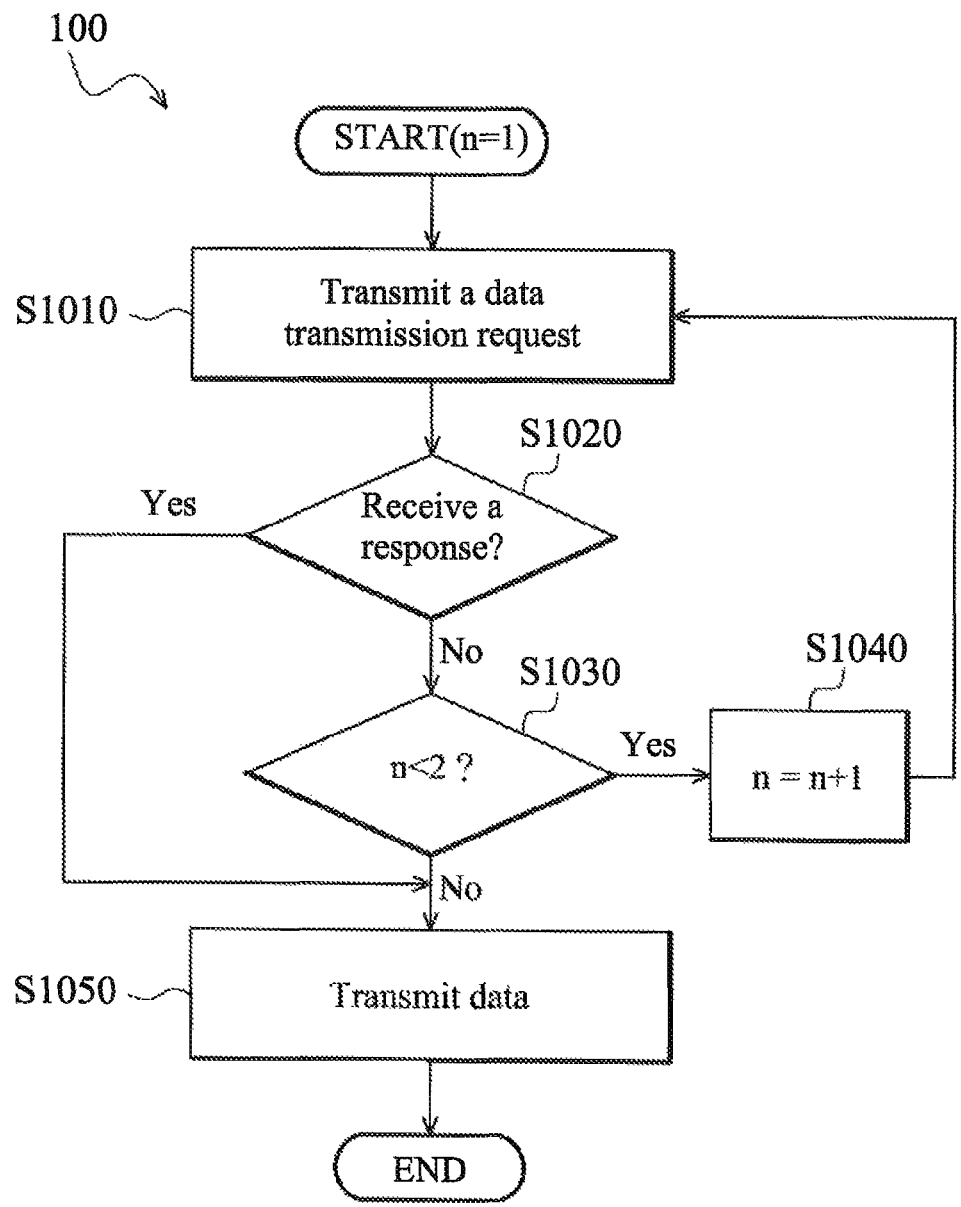
FIG. 10 is a flowchart of a signal transmission method of a power line communication device according to an embodiment of the invention.

FIG. 10 is a flowchart of a signal transmission method 100 of a power line communication device according to an embodiment of the invention. In the beginning of the signal transmission method, the value of n is set to 1. In step S1010, a power line communication device (for example, the power line communication device A, B or C in FIG. 2) transmits a data transmission request, to the coupler device Y1. Then, in step S1020, it is determined whether the power line communication device receives a response from the coupler device Y1. If the power line communication device doesn't receive the response from the coupler device Y1, for example, when the response is interrupted by noise on a live wire, then it is determined whether n is smaller than 2 in step S1030. If n is smaller than 2, n is incremented by 1 in step S1040. After step S1040, the method proceeds back to step S1010 and the power line communication device transmits the data transmission request to the coupler device Y1 again. On the other hand, if it is determined that n is larger than or equal to 2 in step S1030, that is, the power line communication device has already transmitted the data transmission request without receiving the response at least twice, then the power line communication device directly transmits data to the target power line transmission device in step S1050. It is to be understood that the value 2 in step S1030 is only exemplary and the invention is not limited thereto. For example, it can also be determined whether n is smaller than 3 in step S1030. In this case, the power line communication device waits for a response from the coupler device Y1 during a period in which the power line communication device transmits a data transmission request three times. If it is determined that the power line communication device receives the response from the coupler device Y1 in step S1020, the power line communication device, transmits data to the target power line communication device in step S1050.

Figure 11:
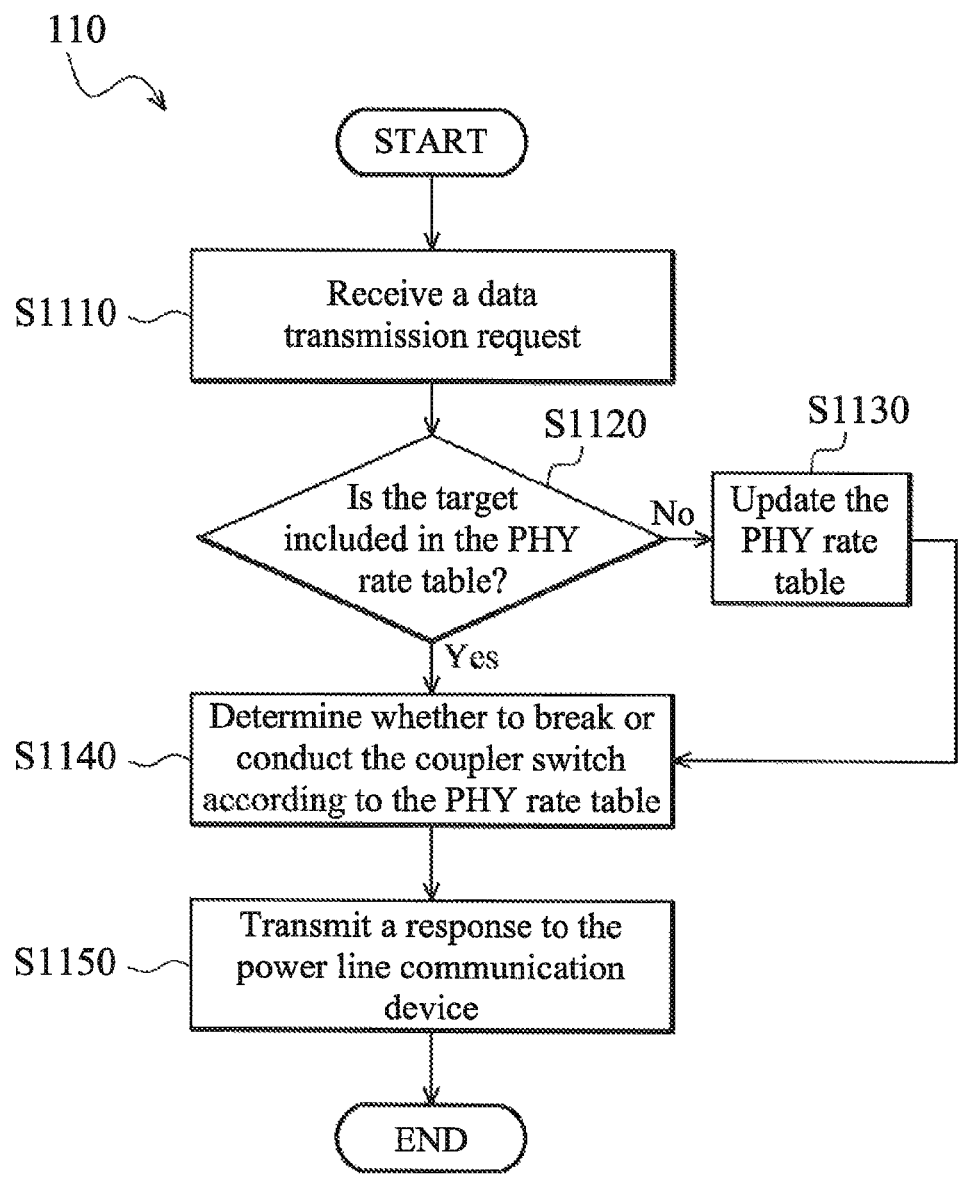
FIG. 11 is a flowchart of a response method of a coupler device in response to data transmission request transmitted by a power line communication device according to an embodiment of the invention.

FIG. 11 is a flowchart of a response method 110 of the coupler device Y1 in response to the data transmission request transmitted by the power line communication device according to an embodiment of the invention. Firstly, in step S1110, the process control unit 300 of the coupler device Y1 receives the data transmission request transmitted from the power line communication device in step S1010 of FIG. 10. Next, in step S1120, the process control unit 300 determines whether the target power line communication device is included in the PHY rate table. Here, the term "PHY rate table" is used as a collective term for the first PHY rate table, the second PHY rate table and the third PHY rate table. If the target power line communication device is not included in the PHY rate table, the target power line communication device may be a newly added power line communication device. In this case, the process control unit 300 updates the PHY rate table in step S1130. For example, the process control unit 300 may detect PHY rates between the target power line communication device and each of other power line communication devices when the coupler switch is open and closed in the same way as FIG. 7 so as to update the first PHY rate table, the second PHY rate table and the third PHY rate table. In step S1140, the process control unit 300 determines whether to break or conduct the coupler switch 310 according to the PHY rate table. For example, regarding the first PHY rate table T1 in FIG. 9A and the second PHY rate table T2 in FIG. 9B, in a case where it is assumed that the power line communication device A is going to transmit data to the power line communication device D, since the PHY rate between the power line communication devices A and D in the first PHY rate table T1 (i.e., 40) is smaller than the PHY rate between the power line communication devices A and D in the second PHY rate table T2 (i.e., 60), that is, the signal quality between the power line communication devices A and D when the coupler switch 310 is closed is better than the signal quality between the power line communication devices A and D when the coupler switch 310 is open, the process control unit 300 determines to conduct the coupler switch 310 to couple the live wire L1 to the live wire L2. Therefore, the power line communication device A can communicate with the power line communication device D through a transmission path including the live wire L1, the coupler device Y1 and the live wire L2. Then, in step S1150, the process control unit 300 transmits a response to the power line communication device to notify the power line communication device of permission to start transmitting data. As described above, before the power line communication device transmits data to the target power line communication device, the process control unit 300 determines whether to couple the live wire L1 to the live wire L2 according to the signal quality between the communication device and the target power line communication device when the coupler device Y1 doesn't couple the live, wire L1 to the live wire L2 and the signal quality between the communication device and the target power line communication device when the coupler device Y1 couples the live wire L1 to the live wire L2.

Figure 12:
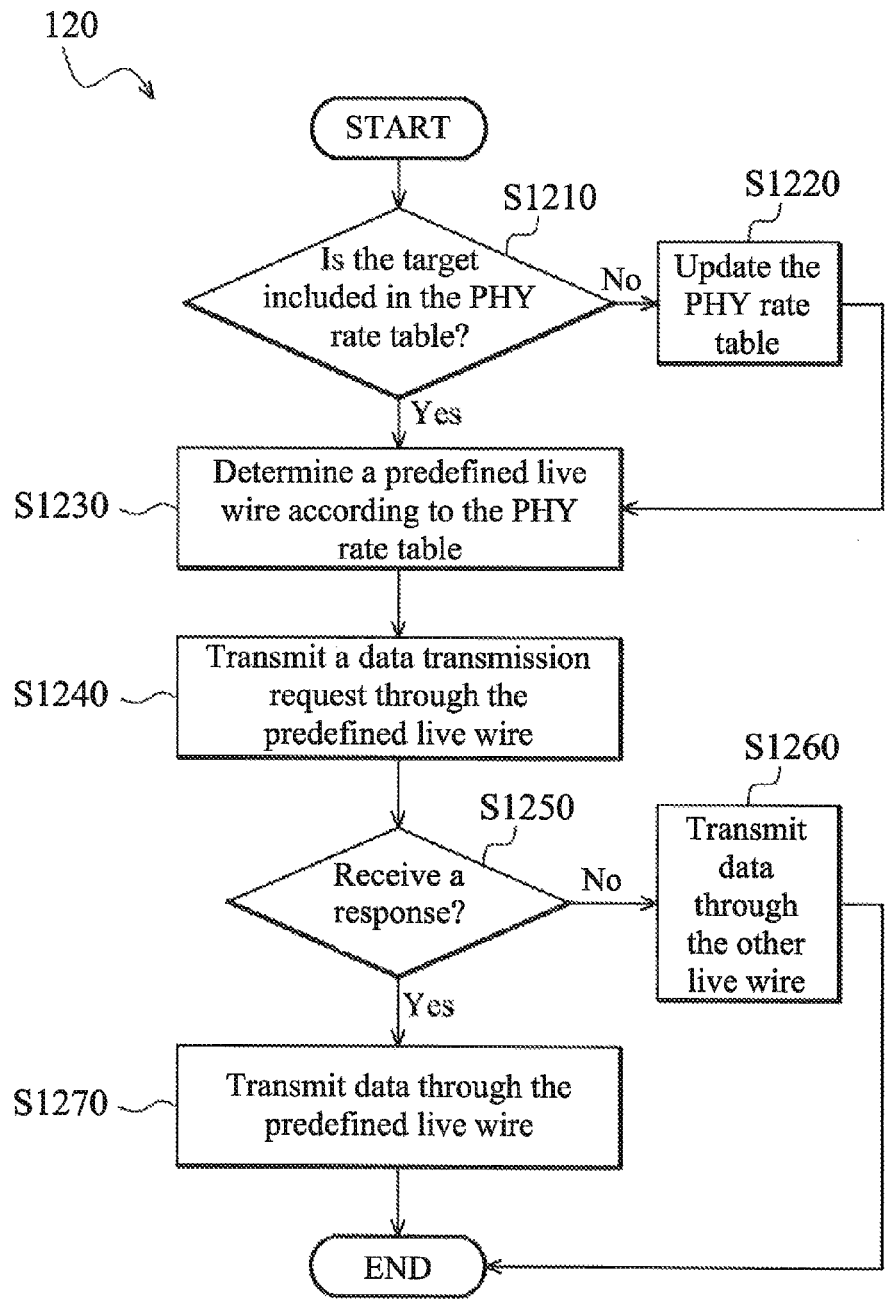
FIG. 12 is a flowchart of a signal transmission method of a coupler device according to an embodiment of the invention.

FIG. 12 is a flowchart of a signal transmission method 120 of the coupler device Y1 according to an embodiment of the invention. Steps S1210 and S1220 are similar to steps S1120 and S1130 in FIG. 11 and thus will not be described again. In step S1230, the process control unit 300 of the coupler device Y1 determines, according to the PHY rate table, a predefined live wire through which data is to be transmitted. Next, in step S1240, the process control unit 300 transmits a data transmission request through the predefined live wire determined in step S1230. In step S1250, the process control unit 300 determines whether a response from the target power line communication device in response to the data transmission request is received. If the process control unit 300 receives the response, the coupler device Y1 transmits data to the target power line communication device through the predefined live wire in step S1270. If the process control unit 300 doesn't receive the response, that is, communication may be interrupted on the predefined live wire due to problems such as noise, then the coupler device Y1 transmits data to the target power line communication device through the other live wire. In an example where the coupler device Y1 is going to transmit data to the power line communication device C, the coupler device Y1 obtains, from the third PHY rate table, that the target power line communication device C is connected to the live wire L1. Accordingly, the coupler device Y1 determines that the live wire L1 is the predefined line wire. Then, the coupler device Y1 transmits a data transmission request to the power line communication device C through the live wire L1. After that, if the coupler device Y1 receives a response from the power line communication device C, the coupler device Y1 transmits data to the power line communication device C through the live wire Li. If the coupler device Y1 doesn't receive the response from the power line communication device C, the coupler device Y1 transmits data to the power line communication device C through the live wire L2.

As described above, the coupler device Y1 configured at the last end of the power line communication system provides another transmission path to avoid the place where noise occurs, thereby preventing the interruption of data transmission caused by noise interference. The coupler device Y1 determines whether to couple the live wire L1 to the live wire L2 according signal qualities between power line communication devices when the live wire L1 is coupled to the live wire L2 and signal qualities between the power line communication devices when the live wire L1 is not coupled to the live wire L2 so as to determine the transmission path. Moreover, in another embodiment, the live wire L1 is coupled to the five wire L2 at the power distribution panel side (power supply side) to reduce signal attenuation at the power distribution panel side.

Methods and apparatus of the present disclosure, or certain aspects or portions of embodiments thereof, may take the form of a program code (i.e., instructions) embodied in media, such as floppy diskettes, CD-ROMS, hard drives, firmware, or any other machine-readable storage medium, wherein, when the program code is loaded into and executed by a machine, such as a computer, the machine becomes an apparatus for practicing embodiments of the disclosure. The methods and apparatus of the present disclosure may also be embodied in the form of a program code transmitted over some transmission medium, such as electrical wiring or cabling, through fiber optics, or via any other form of transmission, wherein, when the program code is received and loaded into and executed by a machine, such as a computer, the machine becomes an apparatus for practicing and embodiment of the disclosure. When implemented on a general-purpose processor, the program code combines with the processor to provide a unique apparatus that operates analogously to specific logic circuits.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A power line communication system, comprising:
a first power line;
a second power line;
a power distribution device, electrically connected to the first power line and the second power line, and supplying power to the first power line and the second power line;
a plurality of power line communication devices, at least comprising a transmitting device and a receiving device, wherein each of the plurality of power line communication devices is electrically connected to at least one of the first power line and the second power line; and
a first coupler device, electrically connected between the first power line and the second power line, and determining, before the transmitting device transmits data to the receiving device, whether to couple the first power line to the second power line according a first signal quality between the transmitting device and the receiving device when the first coupler device doesn't couple the first power line to the second power line and a second signal quality between the transmitting device and the receiving device when the first coupler device couples the first power line to the second power line, wherein positions on the first power line and the second power line which the first coupler device is connected to are farther from the power distribution, device than that which each of the plurality of power line communication devices is connected to.

2. The power line communication system as claimed in claim 1, wherein when the second signal quality is better than the first signal quality, the first, coupler device couples the first power line to the second power line, and when the second signal quality is not better than the first signal quality, the first coupler device doesn't couple the first power line to the second power line.

3. The power line communication system as claimed in claim 1, further comprising:
a second coupler device, electrically connected between the first power line and the second power line, and coupling the first power line to the second power line, wherein positions on the first power line and the second power line which the second coupler device is connected to are nearer to the power distribution device than that which each of the plurality of power line communication devices is connected to.

4. The power line communication system as claimed in claim 1, wherein the first coupler device is further electrically connected to a power line communication device, when the power line communication device transmits data to one target device of the plurality of power line communication devices, the first coupler device determines that data is transmitted to the target device through the first power line or the second power line according to a third signal quality between the power line communication device and the target device when data is transmitted to the target device through the first power line without coupling the first power line to the second power line by the first coupler device and a fourth signal quality between the power line communication device and the target device when data is transmitted to the target device through the second power line without coupling the first power line to the second power line by the first coupler device.

5. The power line communication system as claimed in claim 4, wherein when the third signal quality is better than the fourth signal quality, the first coupler device transmits a data transmission request to the target device through the first power line, wherein when the first coupler device receives a response in response to the data transmission request, the power line communication device transmits data to the target device through the first power line, and when the first coupler device doesn't receive the response in response to the data transmission request, the power line communication device transmits data to the target device through the second power line.

6. The power line communication system as claimed in claim 4, wherein when the fourth signal quality is better than the third signal quality, the first coupler device transmits a data transmission request to the target device through the second power line, wherein when the first coupler device receives a response, in response, to the data transmission request, the power line communication device transmits data to the target device through the second power line, and when the first coupler device doesn't receive the response in response to the data transmission request, the power line communication device transmits data to the target device through the first power line.

7. The power line communication system as claimed in claim 1, wherein the transmitting device transmits a data transmission request to the first coupler device before transmitting data to the receiving device, and the first coupler determines whether to couple the first power line to the second power line according the first signal quality and the second signal quality after receiving the data transmission request and transmits a response to the transmitting device.

8. The power line communication system as claimed in claim 4, wherein the first signal quality, the second signal quality, the third signal quality and the fourth signal quality are determined according to physical layer data rates.

9. The power line communication system as claimed in claim 1, wherein the first power line, and the second power line are live wires.

10. A power line communication system control method, applied to a power line communication system comprising:
   a first power line;
   a second power line;
   a power distribution device, electrically connected to the first power line and the second power line, and supplying power to the first power line and the second power line;
   a plurality of power line communication devices, at least comprising a transmitting device and a receiving device, wherein each of the plurality of power line communication devices is electrically connected to at least one of the first power line and the second power line; and
   a first coupler device, electrically connected between the first power line and the second power line, wherein positions on the first power line and the second power line which the first coupler device is connected to are farther from the power distribution device than that which each of the plurality of power line communication devices is connected to,
   wherein the power line communication system control method comprises:
      determining, before the transmitting device transmits data to the receiving device, whether to couple the first power line to the second power line according a first signal quality between the transmitting device and the receiving device when the first coupler device doesn't couple the first power line to the second power line and a second signal quality between the transmitting device and the receiving device when the first coupler device couples the first power line to the second power line.

11. The method as claimed in claim 10, further comprising:
   when the second signal quality is better than the first signal quality, coupling the first power line to the second power fine by the first coupler device; and
   when the second signal quality is not better than the first signal quality, not coupling the first power line to the second power line by the first coupler device.

12. The method as claimed in claim 10, wherein the power line communication system further comprises a second coupler device, wherein the second coupler device is electrically connected between the first power line and the second power line, positions on the first power line and the second power line which the second coupler device is connected to are nearer to the power distribution device than that which each of the plurality of power line communication devices is connected to, and the power line communication system control method further comprises:
   coupling the first power line to the second power line by the second coupler device.

13. The method as claimed in claim 10, wherein the first coupler device is further electrically connected to a power line communication device, and the power line communication system control method further comprises:
   when the power line communication device transmits data to one target device of the plurality of power line communication devices, determining, by the first coupler device, that data is transmitted to the target device through the first power line or the second power line according to a third signal quality between the power line communication device and the target device when data is transmitted to the target device through the first power line without coupling the first power line to the second power line by the first coupler device and a fourth signal quality between the power line communication device and the target device when data is transmitted to the target device through the second power line without coupling the first, power line to the second power line by the first coupler device.

14. The method as claimed in claim 13, further comprising:
   when the third signal quality is better than the fourth signal quality, transmitting a data transmission request to the target device through the first power line by the first coupler device, transmitting data to the target device through the first power line by the power line communication device if the first coupler device receives a response In response to the data transmission request, and transmitting data to the target device through the second power line by the power line communication device if the first coupler device doesn't receive the response in response to the data transmission request.

15. The method as claimed in claim 13, further comprising:
   when the fourth signal quality is better than the third signal quality, transmitting a data transmission request to the target device through the second power line by the first coupler device, transmitting data, to the target device through the second power line by the power line communication device if the first coupler device receives a response in response to the data transmission request, and transmitting data to the target device through the first power line by the power line communication device, if the first coupler device doesn't receive the response in response to the data transmission request.

16. The method as claimed in claim 10, further comprising:
   transmitting a data transmission request to the first coupler device by the transmitting device, before transmitting data to the receiving device; and determining, by the first coupler, whether to couple the first power line to the second power line according the first signal quality and the second signal quality after receiving the data transmission request, and transmitting a response to the transmitting device.

17. The method as claimed in claim 13, wherein the first signal quality, the second signal quality, the third signal quality and the fourth signal quality are determined according to physical layer data rates.

18. The method as claimed in claim 10, wherein the first power line and the second power line are live wires.

* * * * *